US 8,471,925 B2

(12) United States Patent
Chu

(10) Patent No.: US 8,471,925 B2
(45) Date of Patent: Jun. 25, 2013

(54) DIGITAL IMAGE PROCESSING APPARATUS AND FILE MANAGING METHOD PERFORMED THEREIN

(75) Inventor: Jae-ki Chu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 686 days.

(21) Appl. No.: 11/891,723

(22) Filed: Aug. 13, 2007

(65) Prior Publication Data

US 2008/0222203 A1  Sep. 11, 2008

(30) Foreign Application Priority Data

Mar. 8, 2007  (KR) .................... 10-2007-0023176

(51) Int. Cl.
*H04N 5/76* (2006.01)

(52) U.S. Cl.
USPC .................. 348/231.2; 348/231.3; 348/231.5; 707/822

(58) Field of Classification Search
None
See application file for complete search history.

(56) References Cited

U.S. PATENT DOCUMENTS

| | | | | |
|---|---|---|---|---|
| 5,543,885 | A * | 8/1996 | Yamano et al. | 396/300 |
| 6,111,586 | A * | 8/2000 | Ikeda et al. | 345/619 |
| 6,462,778 | B1 * | 10/2002 | Abram et al. | 348/239 |
| 6,763,182 | B1 * | 7/2004 | Endo et al. | 386/124 |
| 7,370,065 | B1 * | 5/2008 | Rys | 1/1 |
| 7,675,553 | B2 * | 3/2010 | Kumagai | 348/231.2 |
| 7,779,358 | B1 * | 8/2010 | Gupta et al. | 715/730 |
| 2001/0016849 | A1 * | 8/2001 | Squibbs | 707/104.1 |
| 2003/0161617 | A1 * | 8/2003 | Um et al. | 386/121 |
| 2003/0169349 | A1 * | 9/2003 | Aoi et al. | 348/231.2 |
| 2003/0174217 | A1 * | 9/2003 | Kito et al. | 348/231.2 |
| 2003/0189642 | A1 * | 10/2003 | Bean et al. | 348/207.1 |
| 2003/0200229 | A1 * | 10/2003 | Cazier | 707/200 |
| 2004/0126098 | A1 * | 7/2004 | Kim et al. | 386/117 |
| 2004/0179124 | A1 * | 9/2004 | Morimoto et al. | 348/333.02 |
| 2004/0189810 | A1 * | 9/2004 | Aizawa | 348/207.1 |
| 2004/0201690 | A1 * | 10/2004 | Bryant et al. | 348/207.1 |

(Continued)

FOREIGN PATENT DOCUMENTS

| | | |
|---|---|---|
| EP | 1583005 A2 * | 10/2005 |
| JP | 2002-142185 A | 5/2002 |

(Continued)

OTHER PUBLICATIONS

Office Action established for KR 10-2007-0023176 (Apr. 29, 2013).

*Primary Examiner* — Neveen Abel Jalil
*Assistant Examiner* — Daniel Kinsaul
(74) *Attorney, Agent, or Firm* — Drinker Biddle & Reath LLP

(57) ABSTRACT

A digital image processing apparatus capable of reducing the number of calculations performed when a new image file satisfying a DCF standard generated for a captured image is edited, so as to reduce the time required for performing the edit, and a file managing method performed in the digital image processing apparatus. The digital image processing apparatus includes a digital signal processing unit which generates a file having a grouping attribute for a captured image and changes the grouping attribute of the file during a group edit of a selected file.

18 Claims, 11 Drawing Sheets

U.S. PATENT DOCUMENTS

| | | | |
|---|---|---|---|
| 2004/0201752 A1* | 10/2004 | Parulski et al. | 348/231.99 |
| 2005/0110879 A1* | 5/2005 | Izume et al. | 348/231.2 |
| 2005/0259164 A1* | 11/2005 | Kudo | 348/231.2 |
| 2006/0110153 A1* | 5/2006 | Yanagida et al. | 396/310 |
| 2006/0176595 A1* | 8/2006 | Nagata | 360/22 |
| 2007/0027911 A1* | 2/2007 | Hakala et al. | 707/104.1 |
| 2007/0166012 A1* | 7/2007 | Hirata | 386/107 |

FOREIGN PATENT DOCUMENTS

| | | |
|---|---|---|
| JP | 2002-329265 A | 11/2002 |
| JP | 2003-338999 A | 11/2003 |
| KR | 1020050034386 A | 4/2005 |
| KR | 1020060057292 A | 5/2006 |

* cited by examiner

FIG. 2 (PRIOR ART)

```xml
<?xml version="1.0" encoding="UTF-8" standalone="no"?>

<file:Manifest
    xmlns:file="http://ns.osta.org/manifest/1.0/"
    xmlns:mpv="http://ns.osta.org/mpv/1.0/"
    xmlns:mpvp="http://ns.osta.org/mpv/presentation/1.0/"
    xmlns:dc="http://purl.org/dc/elements/1.1/"
    xmlns:dcterm="http://purl.org/dc/terms/"
    xmlns:jpeg="http://www.jpeg.org/jpx/"
    xmlns:mpvm="http://ns.osta.org/mpv/music/1.0/"
    xmlns:nmf="http://ns.osta.org/nmf/1.0/">
    <nmf:Metadata>
        <file:ManifestProperties>
            <file:ProfileBag>
                <file:Profile>http://ns.osta.org/mpv/basic/1.0/</file:Profile>

<file:Profile>http://ns.osta.org/mpv/presentation/1.0/</file:Profile>
            </file:ProfileBag>
        </file:ManifestProperties>
    </nmf:Metadata>

<mpvp:Album>
        <mpvp:Foreground>
            <mpv:StillRef
                mpv:idRef="ID000000"></mpv:StillRef>
        </mpvp:Foreground>
    </mpvp:Album>

<mpv:AssetList>
        <mpv:Still
            mpv:id="ID000000">
            <mpv:LastURL>../DCIM/100SSCAM/SNC10002.JPG</mpv:LastURL>
                                        211
            <nmf:Metadata>
                <dc:Properties>
                    <dcterm:created>2006-01-21T08:33:19Z</dcterm:created>
                </dc:Properties>                  212
            </nmf:Metadata>
        </mpv:Still>
    </mpv:AssetList>
</file:Manifest>
```

200 — (Manifest block)
210 — (Still asset block)
211 — LastURL path
212 — created timestamp

FIG. 5

| EXAMPLES OF CHANGES OF FILE NAMES | ORIGINAL FILE NAMES | CHANGED FILE NAMES |
|---|---|---|
| (a) ■■■■□□□◎.JPG<br>└─┬─┘ └─┬─┘ └┬┘<br>MANUFACTURING  IMAGE     GROUPING<br>COMPANY/DEVICE STORING  DISTINGUISHER<br>MODEL          SERIAL<br>DISTINGUISHER  NUMBER | IMAGE STORING<br>SERIAL NUMBER<br>┌─┴─┐<br>SNV30001.JPG<br>└─┬─┘<br>MANUFACTURING<br>COMPANY/DEVICE<br>MODEL<br>DISTINGUISHER | IMAGE STORING<br>SERIAL NUMBER<br>┌─┴─┐<br>SNV30014.JPG<br>└─┬─┘ └┬┘<br>MANUFACTURING  GROUPING<br>COMPANY/DEVICE DISTINGUISHER<br>MODEL<br>DISTINGUISHER |
| (b) ■■■□□□□◎.JPG<br>└┬┘ └─┬─┘ └┬┘<br>MANUFACTURING  IMAGE     GROUPING<br>COMPANY/DEVICE STORING  DISTINGUISHER<br>MODEL          SERIAL<br>DISTINGUISHER  NUMBER | IMAGE STORING<br>SERIAL NUMBER<br>┌─┴─┐<br>SNV30001.JPG<br>└─┬─┘<br>MANUFACTURING<br>COMPANY/DEVICE<br>MODEL<br>DISTINGUISHER | IMAGE STORING<br>SERIAL NUMBER<br>┌─┴─┐<br>SNV00014.JPG<br>└┬┘ └┬┘<br>MANUFACTURING  GROUPING<br>COMPANY/DEVICE DISTINGUISHER<br>MODEL<br>DISTINGUISHER |
| GROUPING<br>DISTINGUISHER<br>┌┴┐<br>(c) ■■■◎□□□□.JPG<br>└─┬─┘ └─┬─┘<br>MANUFACTURING  IMAGE STORING<br>COMPANY/DEVICE SERIAL NUMBER<br>MODEL<br>DISTINGUISHER | IMAGE STORING<br>SERIAL NUMBER<br>┌─┴─┐<br>SNV30001.JPG<br>└─┬─┘<br>MANUFACTURING<br>COMPANY/DEVICE<br>MODEL<br>DISTINGUISHER | GROUPING<br>DISTINGUISHER<br>┌┴┐<br>SNV40001.JPG<br>└─┬─┘ └─┬─┘<br>MANUFACTURING  IMAGE<br>COMPANY/DEVICE STORING<br>MODEL           SERIAL<br>DISTINGUISHER   NUMBER |
| (d) ■■■■□□□.JPG<br>└─┬─┘ └─┬─┘<br>MANUFACTURING  IMAGE<br>COMPANY/DEVICE STORING<br>MODEL          SERIAL<br>DISTINGUISHER  NUMBER | IMAGE STORING<br>SERIAL NUMBER<br>┌─┴─┐<br>SNV30001.JPG<br>└─┬─┘<br>MANUFACTURING<br>COMPANY/DEVICE<br>MODEL<br>DISTINGUISHER | MANUFACTURING   IMAGE<br>COMPANY/DEVICE  STORING<br>MODEL            SERIAL<br>DISTINGUISHER    NUMBER<br>└──┬──┘ └──┬──┘<br>SNV30001.JPG<br>(STORAGE OF GROUPING<br>DISTINGUISHER IN USER<br>DEFINITION AREA) |

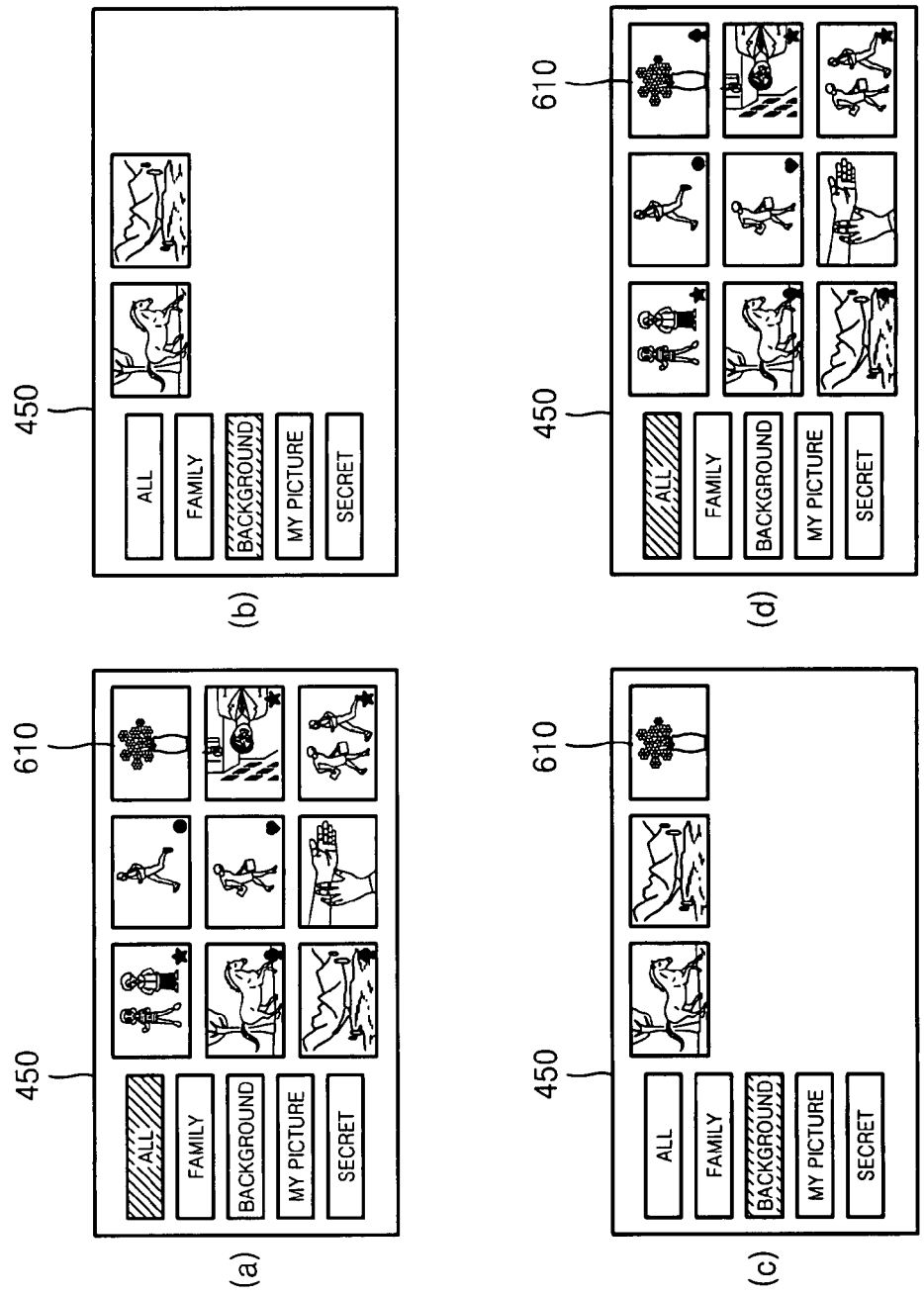

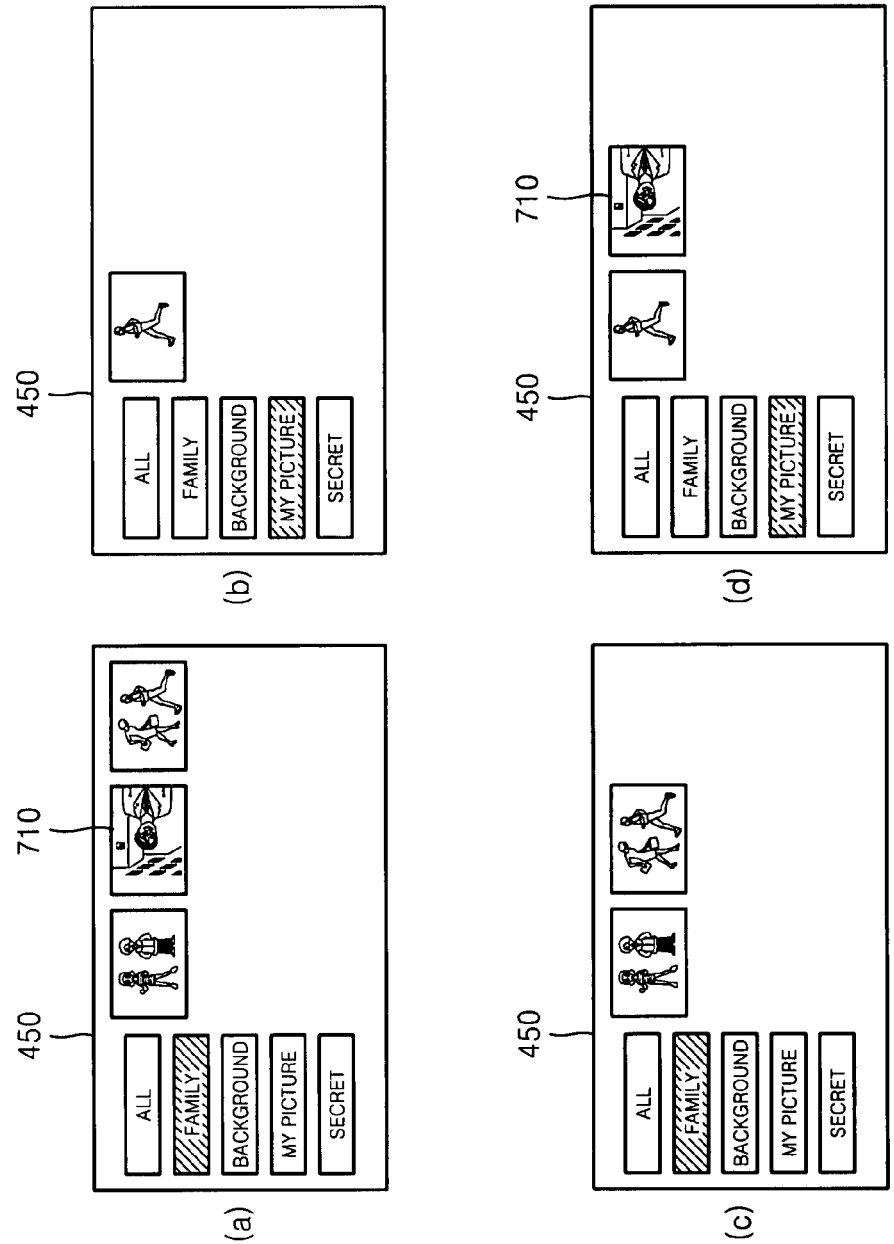

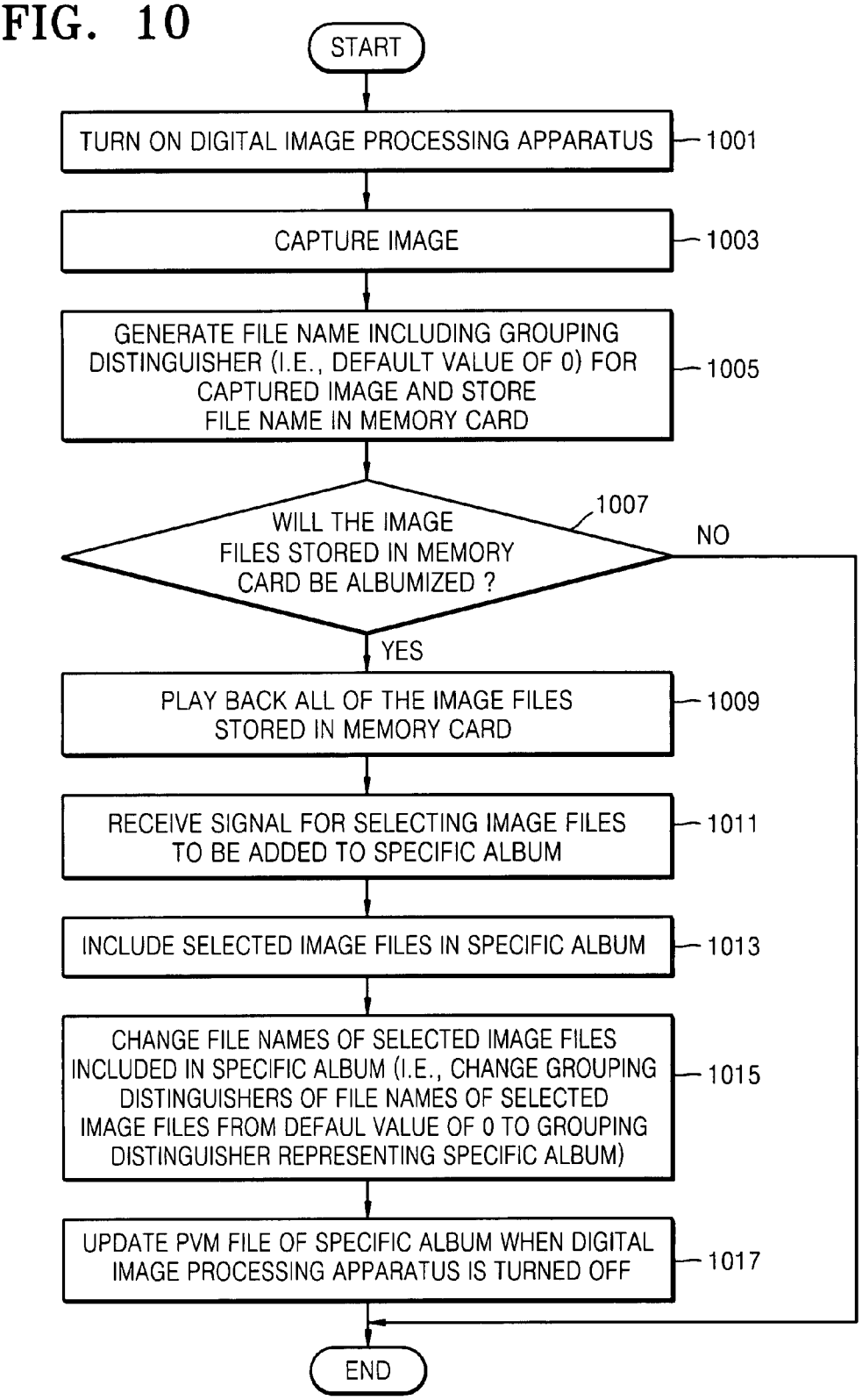

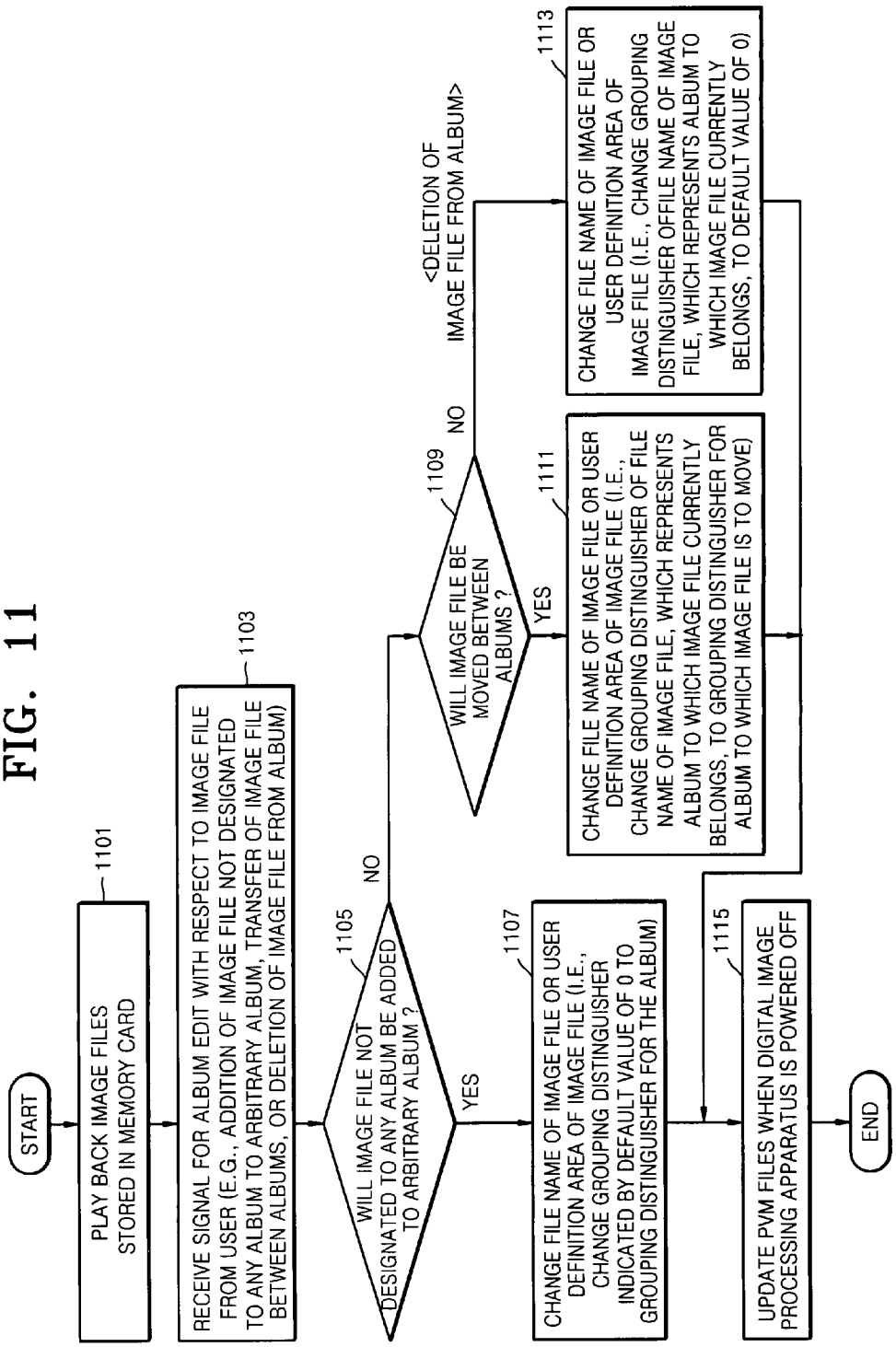

DIGITAL IMAGE PROCESSING APPARATUS AND FILE MANAGING METHOD PERFORMED THEREIN

CROSS-REFERENCE TO RELATED PATENT APPLICATION

This application claims the benefit of Korean Patent Application No. 10-2007-0023176, filed on Mar. 8, 2007, in the Korean Intellectual Property Office, the disclosure of which is incorporated herein in its entirety by reference.

BACKGROUND OF THE INVENTION

1. Field of the Invention

The present invention relates to a digital image processing apparatus and method. More particularly, the present invention relates to a digital image processing apparatus that captures, stores, plays back, and edits an image, and a file management method performed by the digital image processing apparatus.

2. Description of the Related Art

Images captured by digital image processing apparatuses are stored in the form of files classified into folders. The file names, folder names, and a folder structure typically follow a Design rule for Camera File system (DCF).

FIG. 1 illustrates an example of folder names/file names generated by a conventional digital image processing apparatus. As illustrated in FIG. 1, folder names such as 100SSCAM, 101SSCAM, . . . , or 999SSCAM are each divided into a 3-digit serial number, and a 5-digit identifier which is freely designated according to the manufacturing company and/or a model. The 3-digit serial number can only be selected from the figures between '100' and '999', whereas the 5-digit identifier can be any numerals, characters, etc. The 3-digit serial number increments by one according to the sequence in which folders are created. Therefore, the 3-digit serial number of the first folder is '100', and the 3-digit serial number of the next folder is '101'.

The file names, such as SNV30001.JPG, SNV30002.AIV, . . . , or SNV39999.TIF, are each divided into a 4-digit identifier freely designated according to the manufacturing company and/or device model, a 4-digit serial number, and an extension. The 4-digit identifier can be any numerals, characters, etc, whereas the 4-digit serial number can only be selected from the numbers between '0001' and '9999', and files in the same folder cannot use identical serial numbers. The 4-digit serial number increments by one according to the sequence in which files are created. Therefore, the 4-digit serial number of the first file is '0001', and the 4-digit serial number of the next file is '0002'.

The conventional digital image processing apparatus provides an album function, which is included in a playback function, of grouping images stored in a memory card (not shown) according to subjects set by a user, so as to play back images on a group-by-group basis. As shown in FIG. 1, an album folder includes photo-video-music (PVM) files, which are index files respectively allocated to album types and each having location information and time information about the image files of each album type. When an image included in an album is played back, location information and time information about the image that are included in a PVM file corresponding to the album are used.

FIG. 2 illustrates an example of a PVM file recorded in an album folder illustrated in FIG. 1. The number of PVM files created is the same as the number of album types. As shown in FIG. 2, the PVM file is essentially made up of a format part 200 and an information part 210. The information part 210 represents location information 211 and photographing time information 212 on image files included in the album folder. As shown in the information part 210 of FIG. 2, the location information on a file 'SNC10002.JPG' corresponds to a folder 100SSCAM, and the photographing time information corresponds to 8:33:19, Jan. 21, 2006.

When an album edit is performed, such as adding or deleting an arbitrary image file in an album, the PVM file, that is, the information part 210, is changed. The PVM file may be changed while being stored in a memory card, or may be downloaded from the memory card to an internal memory (not shown) and then changed.

When an arbitrary image file is added to an album, an information part 210 for that image file is added to the PVM file. When an arbitrary image file is deleted from an album, an information part 210 for that image file is deleted from the PVM file. As described above, the image files of each album are managed by adding, correcting and deleting an information part 210 of a PVM file using a library provided according to a music-photo-video (MPV) standard.

FIGS. 3(a)-(c) illustrate an embodiment of images played back upon a general album selection. Specifically, FIG. 3(a) illustrates all image files played back when a button 'ALL' is clicked, FIG. 3(b) illustrates image files played back when an album "family" is clicked, and FIG. 3(c) illustrates image files played back when an album "background" is clicked.

Referring to FIGS. 3(a)-(c), there are four albums "family, "background", "my picture", and "secret". Accordingly, referring to FIG. 1, an album folder includes a total of 4 PVM files.

Generally, when a user clicks an album (for example, the family album or the background album) and plays back an image file included in that album as shown in FIG. 3(b) or (c), the location information about the image file is searched for in the PVM file of that album. However, when the user desires to move an image file from one album to another album, many calculations must be performed in the system of the conventional digital image processing apparatus. Thus, a long processing time is required, because the system is restricted to opening only one PVM file at a time.

During the image file transfer, the PVM file of the album from which the image file is to be transferred is opened, an information part 210 for the corresponding image file is deleted from the open PVM file, and then the PVM file is closed. Thereafter, the PVM file of the album to which the image file is to be transferred is opened, the information part 210 for the corresponding image file is added to the opened PVM file, and the PVM file is then closed. Accordingly, the transfer of an image file between albums requires a long time because of frequent opening and closing of PVM files.

As shown in FIG. 3(a), when a user selects an album function 'ALL', all image files are displayed, including those represented by icons (e.g., ♥, ★, ●, ♣), which belong to one of the albums, and those not represented by any icon, which do not belong to any of the albums. For example, an image file (a-1) is represented by a family album icon ★, and an image file (a-2) is not represented by any icon. When an image file is represented by an icon, the conventional digital image processing apparatus parses the PVM file associated with the image file and represents the image file by an icon on the basis of the result of the parsing. However, in order to figure out which album the image file belongs to, all of the PVM files must be individually parsed, which is time-consuming. Also, all of the PVM files must be individually parsed to determine that the image file does not belong to any album. Therefore, it is time-consuming to assign icons to image files.

Moreover, during an album edit such as an addition of an image file to an album, a transfer of an image file between albums, or a deletion of an image file from an album, a PVM file stored in a memory card is downloaded to an internal memory (not shown) of the conventional digital image processing apparatus. This is also time-consuming. The album edit also requires a special operation of uploading a changed PVM file back to the memory card.

SUMMARY OF THE INVENTION

The present invention provides a digital image processing apparatus capable of reducing the number of calculations performed when a new image file satisfying a DCF standard generated for a captured image is edited, so as to reduce the time required for editing, and a file managing method performed in the digital image processing apparatus.

An embodiment of the present invention provides a digital image processing apparatus including a digital signal processing unit which generates a file having a grouping attribute for a captured image and changes the grouping attribute of the file during a group edit of a selected file. Another embodiment of the present invention provides a digital image processing apparatus including a file generating unit which generates a file having a grouping attribute for a captured image, an editing unit which performs a group edit of adding a selected file to a group, a group edit of moving the selected file between groups, or a group edit of deleting the selected file from a group, and a file changing unit which changes the grouping attribute of the file on which the group edit has been performed.

A further embodiment of the present invention provides a digital image processing apparatus including a digital signal processing unit which designates a grouping attribute to one of the characters of a file name based on a design rule for file system (DCF) standard and changes the grouping attribute of the file name upon an addition of a selected file to a group, a transfer of the selected file between groups, and a deletion of the selected file from a group. Another embodiment of the present invention provides a digital image processing apparatus including a digital signal processing unit which records a grouping attribute in a predetermined area of a captured file and changes the grouping attribute recorded in the file upon addition of a selected file to a group, a transfer of the selected file between groups, and a deletion of the selected file from a group.

Still another aspect of the present invention provides a file managing method performed by a digital image processing apparatus, comprising the operations of: generating files having grouping attributes for captured images, performing an edit of adding a file selected from the files to a group, an edit of moving the selected file between groups, or an edit of deleting the selected file from a group, and changing the grouping attribute of the selected file when the edit is completed.

BRIEF DESCRIPTION OF THE DRAWINGS

The above and other features and advantages of the present invention will become more apparent by describing in detail exemplary embodiments thereof with reference to the attached drawings in which:

FIG. 2 illustrates an example of a photo-video-music (PVM) file that is recorded in an album folder illustrated in FIG. 1;

FIGS. 5(a)-(d) illustrate examples of changes of a file name that are performed in the digital image processing apparatus shown in FIG. 4;

FIGS. 6(a)-(d) illustrate an example of an edit to add an image file to an arbitrary album in the digital image processing apparatus shown in FIG. 4;

FIGS. 7(a)-(d) illustrate an example of an edit to move an image file between albums in the digital image processing apparatus shown in FIG. 4;

FIG. 10 is a flowchart of an example of operations for albumizing images with new file names in a file managing method performed by the digital image processing apparatus shown in FIG. 4; and FIG. 11 is a flowchart of an example of album editing operations performed in the file managing method performed by the digital image processing apparatus shown in FIG. 4.

DETAILED DESCRIPTION OF THE EMBODIMENTS

Exemplary embodiments of the present invention will now be described more fully with reference to the accompanying drawings.

Figure 4:
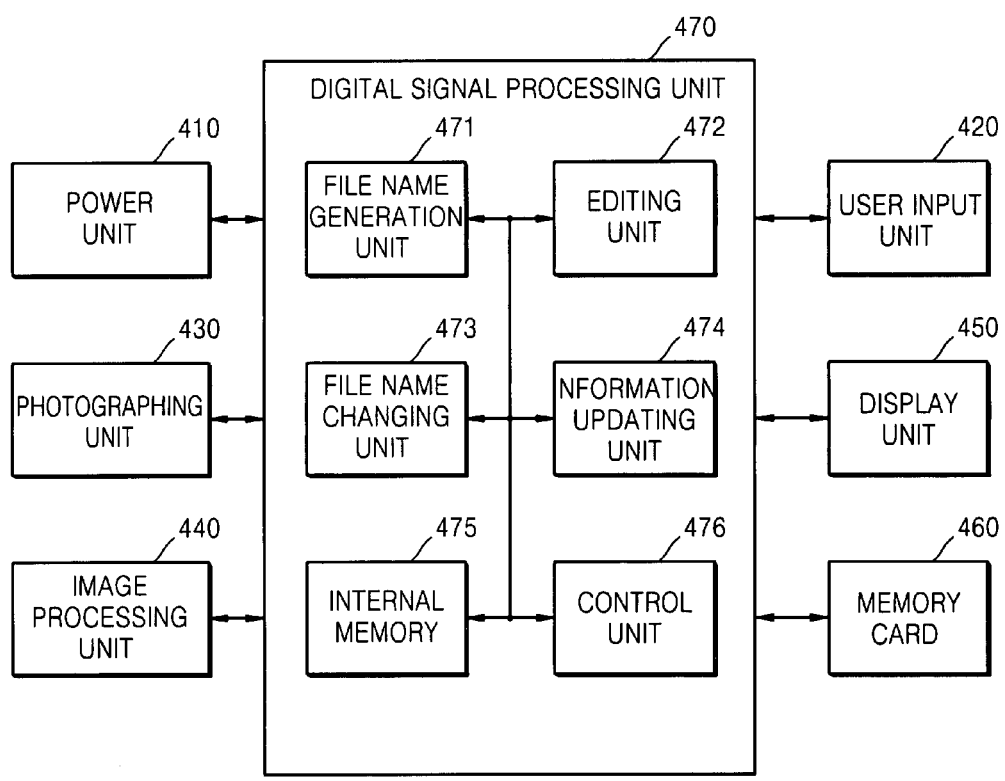
FIG. 4 is a block diagram of an example of a digital image processing apparatus according to an embodiment of the present invention.

FIG. 4 is a block diagram of an example of a digital image processing apparatus according to an embodiment of the present invention. Referring to FIG. 4, the digital image processing apparatus includes a power unit 410, a user input unit 420, a photographing unit 430, an image processing unit 440, a display unit 450, a memory card 460, and a digital signal processing unit 470. The power unit 410 supplies power to operate the digital image processing apparatus. The user input unit 420 includes a shutter-release button (not shown) which is opened or closed to expose a charge coupled device (CCD) to light for a certain period of time, a power button (not shown) which turns the digital image processing apparatus on or off, a wide-angle zoom button (not shown) or telephoto-zoom button (not shown) which increases or decreases the angle of view according to an input of a user, and a function button (not shown) for executing a variety of menu functions associated with the operations of the digital image processing apparatus.

Figure 1:
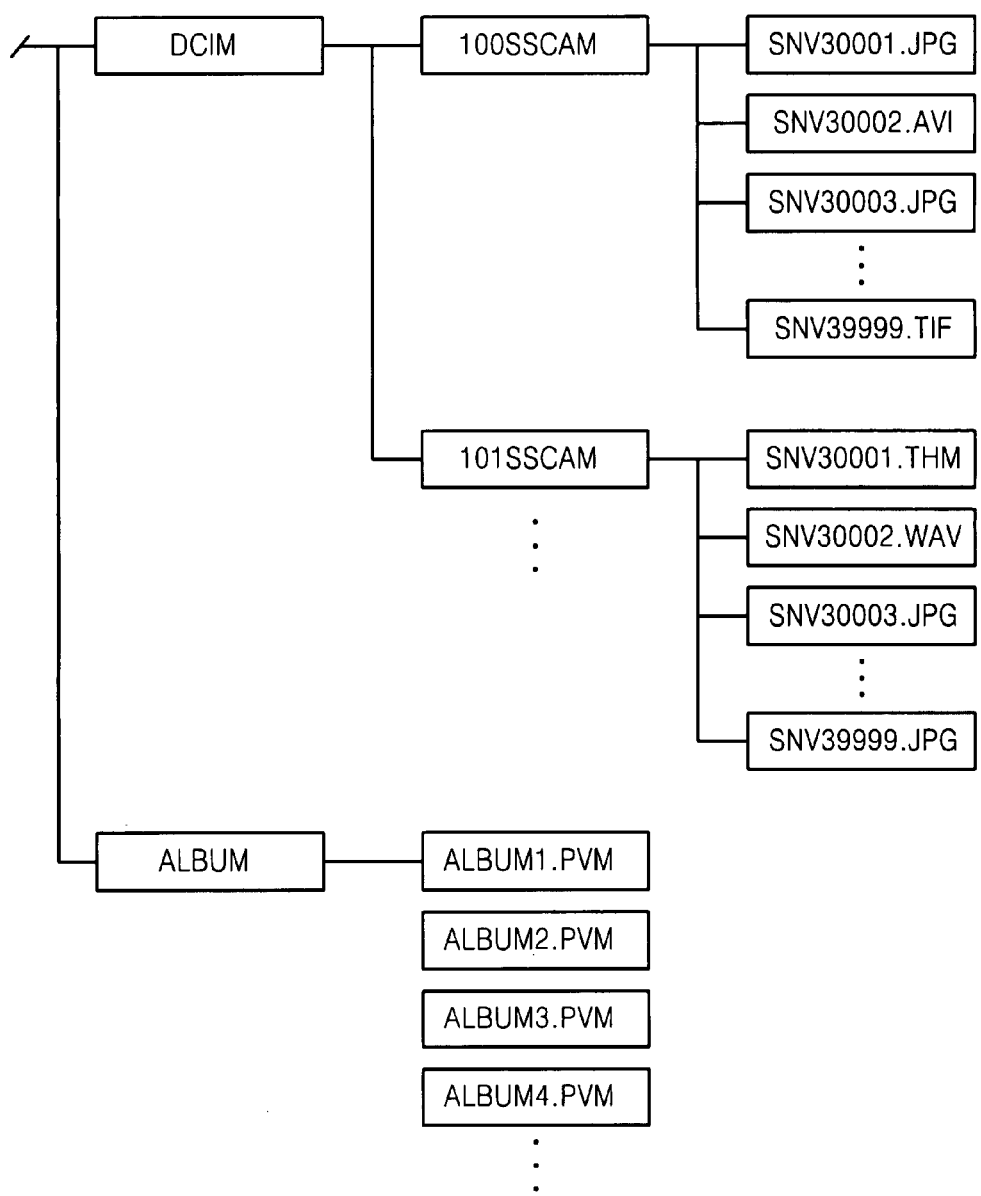
FIG. 1 illustrates an example of folder names/file names generated by a conventional digital image processing apparatus.
Figure 3:
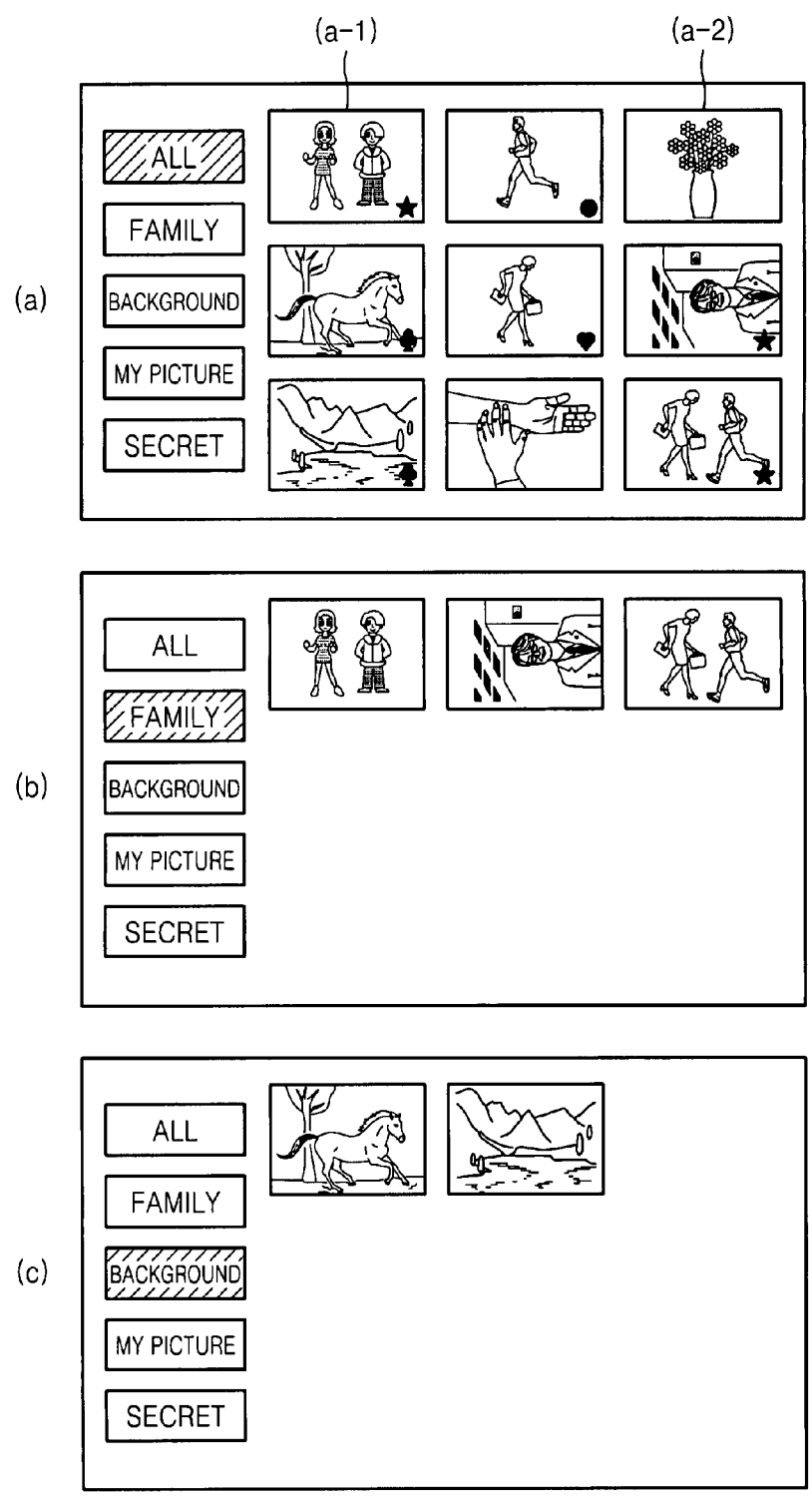
FIGS. 3(a)-(c) illustrates an example of images played back upon general album selection.

Although not shown in FIG. 1, the photographing unit 430 includes a shutter-release button, a lens unit, a stop, a CCD, and an analog-to-digital converter (ADC). The shutter-release button controls the amount of exposure light in cooperation with the stop. The lens unit receives light from an external light source to process an image. At this time, the stop controls the amount of incident light by varying the openness. The openness of the stop is controlled by the digital signal processing unit 470. The CCD accumulates the light received through the lens unit and outputs the image captured by the lens unit in synchronization with a vertical synchronization signal according to the amount of accumulated light.

Image acquisition in the digital image processing apparatus is achieved, for example, by a CCD that converts light reflected from an object into an electrical signal. In order to obtain a color image using the CCD, a color filter is used. In certain cases, a filter (not shown) called a color filter array (CFA) is used. A CFA is an array of pixels that each transmits only light of one color. Depending on the arrangement, the CFA has a variety of shapes. The ADC converts an analog image signal output from the CCD into a digital signal.

The image processing unit 440 performs signal processing so that the digital image signal can be displayed. A device used in the CCD and CFA is sensitive to temperature and thus generates a dark current according to the varying temperature. Thus, an undesired black level is included in the digital image signal. The image processing unit 440 removes the black level caused by the dark current.

The image processing unit 440 also performs gamma correction. Human vision responds nonlinearly to brightness, according to Weber's law. Accordingly, when a limited bit depth is given and the brightness of light is linearly recorded, posterization occurs. Thus, an image signal should be encoded using a nonlinear function in order to display the best quality of image at a limited bit depth. As such, the encoding of the image signal in accordance with the nonlinearity of human vision is referred to as gamma correction. The image processing unit 440 performs gamma correction on an input image signal using a gamma curve. For example, the image processing unit 440 corrects the input luminance level of a 12-bit image signal into the luminance level of an 8-bit image signal.

The image processing unit 440 performs a CFA interpolation in which a bayer pattern implemented in RGRG and GBGB lines of gamma-corrected data is interpolated to an RGB line. In the CFA interpolation performed by the image processing unit 440, a G channel is first restored from pixels having, for example, only R or B channel values, and empty channel values are filled in the sequence of a B channel and an R channel or vice versa, thereby restoring three channels R, G, and B.

The image processing unit 440 also performs an edge compensation operation of changing an interpolated RGB signal into a YUV signal and filtering a Y signal using a high-band filter in order to create a distinct image, performs color correction on the color values of U and V signals using a standard color coordinate system, and removes noise from the Y, U, and V signals. The image processing unit 440 generates a JPG file by compressing and processing the Y, U, and V signals from which noise has been removed. The JPG file is displayed on the display unit 450 according to a selection of the user or stored in the memory card 460.

All of the operations of the image processing unit 440 are performed under the control of the digital signal processing unit 470. The digital signal processing unit 470 performs a variety of control operations for image photographing. The digital signal processing unit 470 generates a file by including a grouping attribute in a captured image, and changes the grouping attribute of a selected file when the selected file is edited. To achieve this, the digital signal processing unit 470 includes a file name generation unit 471, an editing unit 472, a file name changing unit 473, an information updating unit 474, an internal memory 475, and a control unit 476.

The file name generating unit 471 generates a new file name for the captured image based on the DCF standard. A general DCF standard based file, as shown in FIG. 1, includes a 4-digit identifier representing the manufacturing company or device model, a 4-digit serial number, and an extension. The file name generated by the file name generating unit 471 allocates an album attribute, namely, a grouping distinguisher, to one of the 8 digits while conforming to the DCF standard.

FIGS. 5(a)-(d) illustrate examples of changes of file names that are performed in the digital image processing apparatus shown in FIG. 4. The file name shown in FIG. 5(a) includes a 4-digit identifier, a 3-digit serial number, a 1-digit grouping distinguisher, and an extension. In other words, in this example, one of the four digits of a serial number is used for the grouping distinguisher. In this example, the front 4 digits ■ ■ ■ ■ are used for the manufacturing company/device model identifier. The next 3 digits ▢▢▢ are used for an image storing serial number. The last one digit ⊚ is used for a grouping distinguisher. Assuming that a file name is 'SNV30001.JPG', the file name generating unit 471 generates the name 'SNV30014.JPG' for the same file. In the name 'SNV30014.JPG', 'SNV3' is the manufacturing company/device model identifier, '001' is an image storing serial number, and '4' is a grouping distinguisher. For convenience of explanation, '4' is set as the one-digit grouping distinguisher. However, the grouping distinguisher which is initially generated by the file name generating unit 471 is set as a default value (e.g., 0). When an album of the file is completely edited, the grouping distinguisher is changed from the default value of 0 to a specific value (i.e., a grouping distinguisher representing an album attribute).

When the file name generating unit 471 generates a file name as shown in FIG. 5(a), the number of image files which can be stored in each folder is reduced to, for example, 1/10 the number of storable image files in the conventional art. However, the case shown in FIG. 5(a) has an advantage in that when the memory card 460 transmits the image files to a PC and stored therein, the image files are displayed on a PC, such as a windows explorer, in the order that images were photographed. The reduction of the number of image files that can be stored in each folder can be solved by using some of the four digits of the 4-digit identifier in connection with the serial number.

The file name shown in FIG. 5(b) includes a 3-digit identifier, a 4-digit serial number, a 1-digit grouping distinguisher, and an extension. The front 3 digits ■ ■ ■ are used for the manufacturing company/device model identifier. The next 4 digits ▢▢▢ are used for an image storing serial number. The last one digit ⊚ is used for a grouping distinguisher. Assuming that a file name is 'SNV30001.JPG', the file name generating unit 471 generates a name 'SNV00014.JPG' for the same file. In the name 'SNV00014.JPG', 'SNV' is the manufacturing company/device model identifier, '0001' is an image storing serial number, and '4' is a grouping distinguisher. For convenience of explanation, '4' is set as the one-digit grouping distinguisher. However, the grouping distinguisher which is initially generated by the file name generating unit 471 is set as a default value (e.g., 0). When an album of the file is completely edited, the grouping distinguisher is changed from the default value to a specific value (i.e., a grouping distinguisher representing an album attribute). When the file name generating unit 471 generates a file name as shown in FIG. 5(b), the image files stored in a PC are displayed on the PC, such as a windows explorer, in the order that images were photographed, and 9999 image files can be stored in each folder.

The file name shown in FIG. 5(c) includes a 3-digit identifier, a 1-digit grouping distinguisher, a 4-digit serial number, and an extension. In other words, in the present example, one of the four digits of a 4-digit identifier is used for the grouping distinguisher. The front 3 digits ■ ■ ■ are used for the manufacturing company/device model identifier. The next one digit ⊙ is used for a grouping distinguisher. The last 4 digits ▭▭▭ are used for an image storing serial number. Assuming that a file name is 'SNV30001.JPG', the file name generating unit 471 generates a name 'SNV40001.JPG' for the same file. In the name 'SNV40001.JPG', 'SNV' is the manufacturing company/device model identifier, '4' is a grouping distinguisher, and '0001' is an image storing serial number. For convenience of explanation, '4' is set as the one-digit grouping distinguisher. However, the grouping distinguisher which is initially generated by the file name generating unit 471 is set as a default value (e.g., 0).

When an album of the file is completely edited, the grouping distinguisher is changed from the default value to a specific value (i.e., a grouping distinguisher representing an album attribute). When the file name generating unit 471 generates a file name as shown in FIG. 5(c), the image files stored on a PC are displayed on the PC, such as a windows explorer, in the order that image groups were photographed rather than in the order that images were photographed. However, this case has the advantage that 9999 image files can be stored in each folder.

The file name shown in FIG. 5(d) has a different form from those shown in FIGS. 5(a)-(c). For example, the file name shown in FIG. 5(d) includes a 4-digit identifier, a 4-digit serial number, and an extension. The front 4 digits ■■■■ are used for the manufacturing company/device model identifier. The next 4 digits ▭▭▭ are used for an image storing serial number. The file name shown in FIG. 5(d) has no grouping distinguisher, but the images store a grouping distinguisher in a user definition area. An image file contains a MakerNote data area, which is a user definition area that can be used according to the purpose of each manufacturing company. The file name generating unit 471 generates a file name (e.g., a conventional file name) and records a grouping distinguisher with a default value of 0 in the MakerNote data area. Referring back to FIG. 4, the editing unit 472 performs an album edit under the control of the control unit 476 according to an edit signal selected by a user. For example, edits performed by the editing unit 472 may be roughly classified as three types: an edit in which an image file to which an album has not been designated is added to an arbitrary album, an edit in which an image file is moved between albums, and an edit in which an image file is deleted from an album, that is, an album attribute is deleted from an image file within an album.

An edit in which an image file to which an album has not been designated is added to an arbitrary album will now be described with reference to FIGS. 6(a)-(d). For convenience of explanation, all image files to be described below are assumed to have a file name (■■■■▭▭▭⊙.JPG) in the format shown in FIG. 5(a). It is also assumed that the grouping distinguisher of a family album is 1, the grouping distinguisher of a background album is 2, the grouping distinguisher of a my picture album is 3, and the grouping distinguisher of a secret album is S.

FIG. 6(a) illustrates image files played back by the display unit 450 when an album function 'ALL' is selected. The images indicated by icons have file names in which grouping distinguishers have specific values. The images not indicated by icons have file names in which grouping distinguishers have the default value of 0. An image file 610 not indicated by an album icon is assumed to be moved to the background album. The image file 610 is assumed to have a file name 'SNV33210.JPG'. In FIG. 6(b), the display unit 450 displays two image files belonging to the background album, for examples, images with file names 'SNV30112.JPG' and 'SNV31592.JPG'.

The control unit 476 receives from a user an edit signal for moving the image file 610 to the background album, and issues a command corresponding to the edit signal to the editing unit 472. When the moving edit is completed, the file name changing unit 473 changes the grouping distinguisher of the file name of the image file 610 from the default value of 0 to 2. Accordingly, the file name of the image file 610 is changed from 'SNV33210.JPG' to 'SNV33212.JPG'.

In FIG. 6(c), the display unit 450 displays the images included in the background album, including the image file 610 with the changed file name. Thereafter, when the user selects the album function 'ALL', an image file 610 indicated by a background album icon ♣ is displayed as illustrated in FIG. 6(d).

Although not shown in FIGS. 6(a)-(d), when an edit for adding the image file 610 to which no albums are designated to the secret album is performed, the file name changing unit 473 changes the grouping distinguisher of the file name of the image file 610 from the default value of 0 to S. Accordingly, the file name of the image file 610 is changed from 'SNV33210.JPG' to 'SNV3321S.JPG'.

The edit of adding an image file to an arbitrary album may be performed at least once according to a selection of the user. The control unit 476 monitors the state of the power unit 410. When the control unit 476 detects a power off signal, the control unit 476 controls the information updating unit 474 to update all the PVM files at one time. The update corresponds to addition of the information part (i.e., location information and photographing time information) of the image file 610 to the PVM file corresponding to the background album. As described above, an album folder includes PVM files for album types, which are index files having location information and time information about the image files of each album. The present invention can use, for example, a standard PVM file in order to achieve compatibility with other media.

When a PVM file is stored in the memory card 460, the control unit 476 controls the information updating unit 474 to directly access the memory card 460 to update the PVM file. However, when the PVM file is downloaded from the memory card 460 and stored in the internal memory 475, the control unit 476 controls the information updating unit 474 to update the internal memory 475 and instructs an update in the internal memory 475 to be uploaded to the memory card 460. Thus, when the power is turned off, the PVM files are updated with all of the edit results at one time, reducing the time required to update a PVM file upon every edit.

Additionally, when the edit for adding is performed using the MakerNote data area, the file name changing unit 473 does not change the file name but changes the grouping distinguisher recorded in the MakerNote data area from the default value of 0 to '2' and records the grouping distinguisher '2'. Accordingly, upon an edit using the MakerNote data area, there is no need to update the PVM file.

Next, an edit in which an image file is moved between albums will be described with reference to FIGS. 7(a)-(d). FIG. 7(a)-(d) illustrates an edit to move an image file 710 from a family album to my picture albums in the digital image processing apparatus shown in FIG. 4.

In FIG. 7(a), the display unit 450 displays three image files that belong to the family album. It is assumed that the three image files in sequence from left to right respectively have the file names SNV30021.JPG, SNV30451.JPG, and SNV31691.JPG. In FIG. 7(b), the display unit 450 displays one image file that belongs to the my picture album. The image file is assumed to have the file name SNV30213.JPG.

When the control unit 476 receives from a user an edit signal for moving the image file 710 included in the family album into the my picture album, the control unit 476 issues a command correspond to the edit signal to the editing unit 472. When the edit for moving is completed, the file name changing unit 473 changes the grouping distinguisher of the file name of the image file 710 from '1' to '3'. Accordingly, the file name 'SNV30451.JPG' of the image file 710 is changed to 'SNV30453.JPG'.

As shown in FIGS. 7(c) and 7(d), the image file 710 included in the family album has been moved to the my picture album. Thereafter, when the user selects the album function 'ALL', an album icon allocated to the image file 710 is changed from '★' to '●'.

Although not shown in FIGS. 7(a)-(d), when an edit to move the image file 710 from the family album to a secret album is performed, the file name changing unit 473 changes the grouping distinguisher of the file name of the image file 710 from '1' to 'S'. Accordingly, the file name 'SNV30451.JPG' of the image file 710 is changed to 'SNV3045S.JPG'.

The edit of moving an image file between albums may be performed at least once according to a selection of the user. The control unit 476 monitors the state of the power unit 410. When the control unit 476 detects a power off signal, the control unit 476 controls the information updating unit 474 to update the PVM files. The update corresponds to a deletion of the information part (i.e., location information and photographing time information) of the image file 710 from a PVM file corresponding to the family album and an addition of the deleted information part to a PVM file corresponding to the my picture album. The updating method has already been described above, so it will not be described in greater detail.

Additionally, when the edit for moving is performed using the MakerNote data area, the file name changing unit 473 does not change the original file name but changes the grouping distinguisher recorded in the MakerNote data area from '1' to '3' and records the grouping distinguisher '3'. Accordingly, upon the edit for moving using the MakerNote data area, there is no need to update the PVM files.

Next, an edit in which an image file is deleted from an album, that is, an album attribute is deleted from the image file included in the album, will be described with reference to FIGS. 8(a)-(d). Specifically, FIGS. 8(a)-(d) illustrate an edit to delete an image file 810 from a background album in the digital image processing apparatus shown in FIG. 4.

Figure 8:
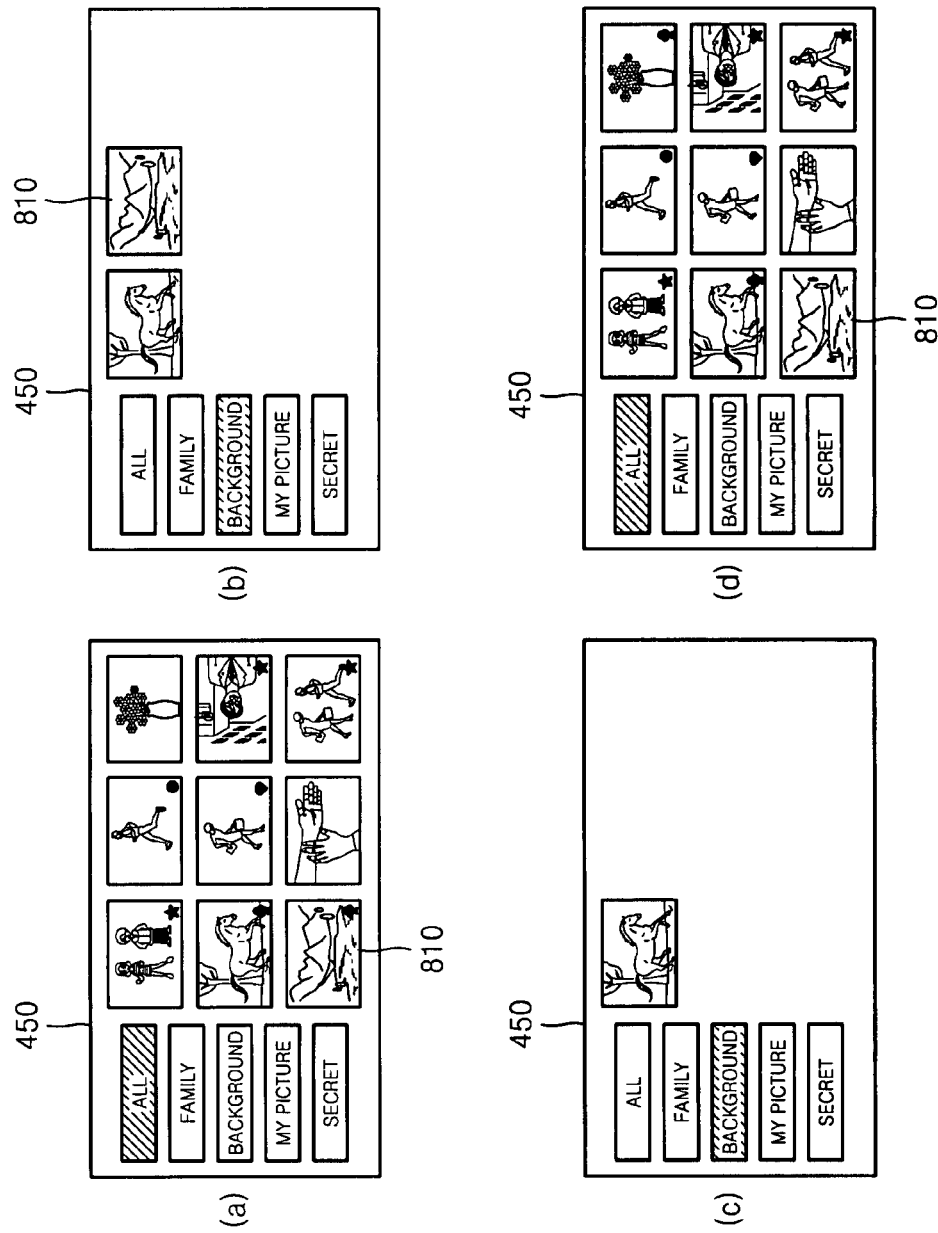
FIGS. 8(a)-(d) illustrates an example of an edit to delete an image file from an arbitrary album in the digital image processing apparatus shown in FIG. 4.

FIG. 8(a) illustrates image files played back by the display unit 450 when an album function 'ALL' is selected. The images indicated by icons have file names in which grouping distinguishers have specific values. The images not indicated by icons have file names in which grouping distinguishers have the default value of 0. In FIG. 8(b), the display unit 450 displays two image files belonging to the background album, for example, images with file names 'SNV30112.JPG' and 'SNV31592.JPG'.

The control unit 476 receives from a user an edit signal for deleting the image file 810 from the background album and issues a command corresponding to the edit signal to the editing unit 472. When the edit for deleting is completed, the file name changing unit 473 changes the grouping distinguisher of the file name of the image file 810 from 2 to the default value of 0. Accordingly, the file name of the image file 810 is changed from 'SNV31592.JPG' to 'SNV31590.JPG'.

In FIG. 8(c), the display unit 450 displays the image included in the background album, from which the image file 810 has been removed. Thereafter, when the user selects the album function 'ALL', an image file 810 from which a background album icon ♣ has been removed is displayed as illustrated in FIG. 8(d).

Although not shown in FIGS. 8(a)-(d), when an edit for deleting an image file from a secret album is performed, the file name changing unit 473 changes the grouping distinguisher of the file name of the image file to be deleted from S to the default value of 0. Thereafter, when the user selects the album function 'ALL', the deleted image file is displayed with no album icon.

The edit of deleting an image file from an arbitrary album may be performed at least once according to a selection of the user. The control unit 476 monitors the state of the power unit 410. When the control unit 476 detects a power off signal, the control unit 476 controls the information updating unit 474 to update all the PVM files at one time. The update corresponds to a deletion of the information part (i.e., location information and photographing time information) of the image file 810 from the PVM file corresponding to the background album. The updating method has already been described above, so it will not be described in greater detail.

Additionally, when the edit for deleting is performed using the MakerNote data area, the file name changing unit 473 does not change the file name but changes the grouping distinguisher recorded in the MakerNote data area from '2' to the default value of 0. Accordingly, upon an edit using the MakerNote data area, there is no need to update the PVM file.

In another embodiment, one image file may be included in a plurality of albums by binarizing the number of albums. A binary number having an equal number of digits to the number of albums is generated. The identifiers of albums in which the single image file is to be included are designated by the binary number. Thereafter, a decimal number corresponding to the binary number is designated as a grouping distinguisher of the file name of the single image file.

For example, when there are a total of 4 albums, a 4-digit binary number is generated. When an image file is to be included in a first album and a second album, the first and second digits of the 4-digit binary are designated as the first and second albums. This binary number is '0011', and its decimal equivalent is 3. When the decimal number 3 is used as a grouping distinguisher of an image file, it indicates that the image file is included in both the first album and the second album. Thus, a single image can be included in a plurality of albums.

Figure 9:
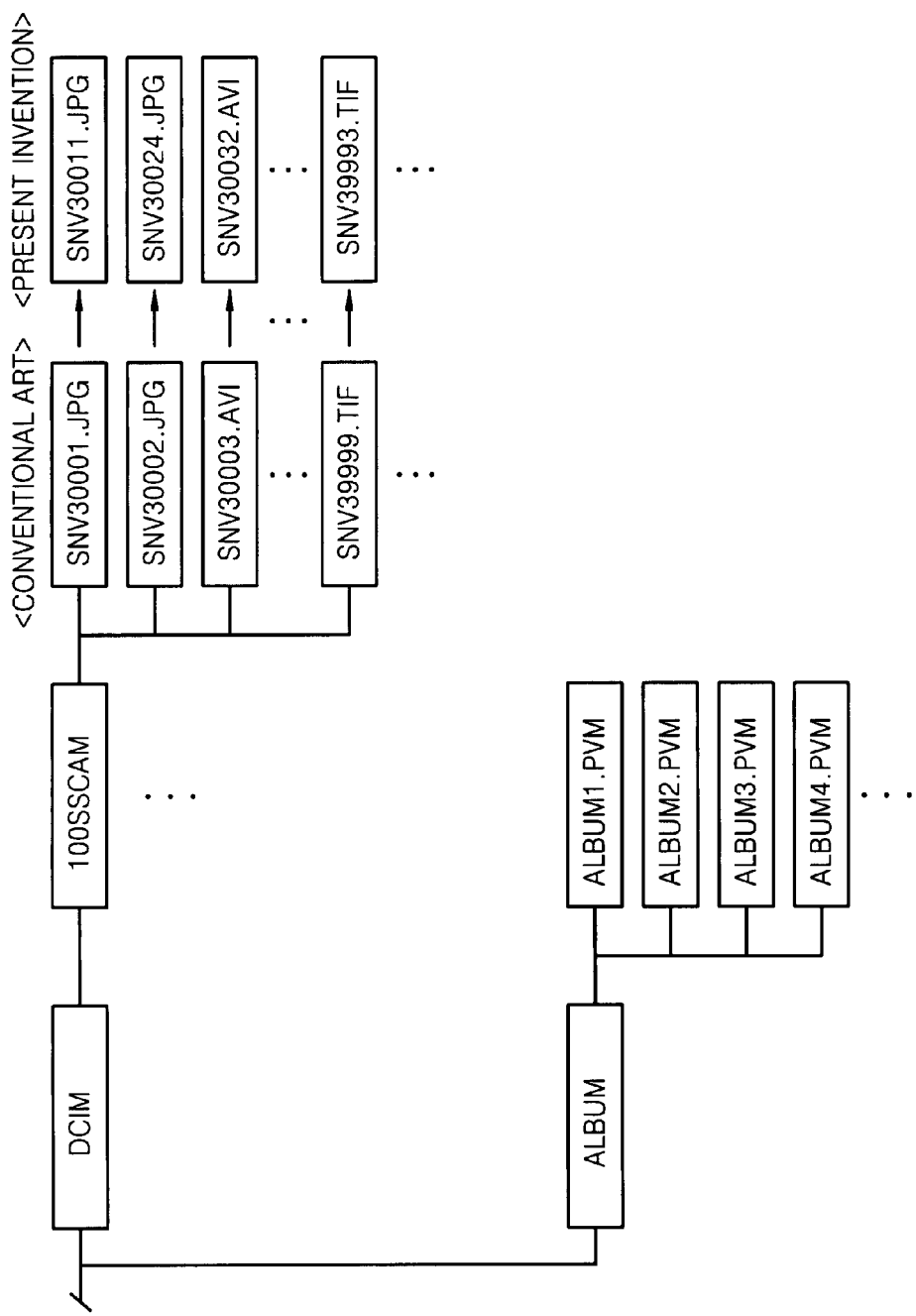
FIG. 9 illustrates examples of file names changed by editing performed in the digital image processing apparatus shown in FIG. 4.

FIG. 9 illustrates examples of file names changed by the edits performed in the digital image processing apparatus shown in FIG. 4. The file names according to an embodiment of the present invention included in each folder follow a DCF standard as in the conventional art, but a grouping distinguisher is designated to one of the digits of each file name. Another embodiment (not shown) may exist in which the file names according to the present invention are the same as those according to the conventional art. However, in such an embodiment, a grouping distinguisher is recorded in a MakerNote data area, and thus the MakerNote data area is different from a conventional MakerNote data area.

A file managing method performed in a digital processing apparatus according to the present invention will now be described with reference to FIGS. 10 and 11. The file managing method may be performed in the digital signal processing unit 470 shown in FIG. 4. In some embodiments, the main algorithm of the file managing method may be performed in the digital signal processing unit 470 in cooperation with peripheral components of the digital image processing apparatus of FIG. 4.

FIG. 10 is a flowchart of an example of operations for albumizing images with new file names in a file managing method performed by the digital image processing apparatus shown in FIG. 4. Here, it is assumed that the current memory card 460 has no image files.

After the power of the digital signal processing unit 470 is turned on in operation 1001, a user photographs an image in operation 1003. In operation 1005, the digital signal processing unit 470 generates a file name including a grouping distinguisher for the captured image and stores the image with the file name in the memory card 460. The grouping distinguisher of the file name generated by the digital signal processing unit 470 is given the default value of 0. Thereafter, when the image files stored in the memory card 460 are to be albumized in operation 1007, the digital signal processing unit 470 plays back all the image files stored in the memory card 460, in operation 1009.

In operation 1011, the digital signal processing unit 470 receives a signal for selecting image files to be added to a specific album from the displayed image files. Thereafter, the digital signal processing unit 470 includes the selected image files in the specific album in operation 1013, and changes the file names of the selected image files included in the specific album in operation 1015. The grouping distinguishers of the file names of the selected image files are given the default value of 0. The digital signal processing unit 470 changes the grouping distinguishers of the file names of the selected image files from the default value of 0 to a grouping distinguisher representing the attribute of the specific album. Alternatively, the digital signal processing unit 470 changes the grouping distinguishers recorded in the MakerNote data areas of the selected image files from the default value of 0 to the grouping distinguisher representing the attribute of the specific album.

In operation 1017, the digital signal processing unit 470 monitors the power state of the digital image processing apparatus and updates the PVM file of the specific album when detecting a power off signal. Information parts (e.g., location information and photographing time information) of the selected image files are added to the PVM file of the specific album. When the grouping distinguisher of an image file is recorded in the MakerNote data area of the image file, there is no need to update the PVM file of the specific album.

FIG. 11 is a flowchart of an example of album editing operations performed in the file managing method performed by the digital image processing apparatus shown in FIG. 4. In this example, it is assumed that the image files stored in the memory card 460 are made up of those included in albums according to the method as shown in FIG. 10, and those not included in any albums.

To perform the album editing operation, first, the digital signal processing unit 470 plays back the image files stored in the memory card 460 in operation 1101. These image files include image files having icons and belonging to albums, and image files having no icons and not belonging to any album.

In the conventional art, in order to play back an image file stored in the memory card 460 and mark that image file with an album icon, all of the PVM files must be parsed to find a PVM file including data consistent with the information part of the image file (i.e., location information and photographing time information about the image file). This process is time consuming. Moreover, all of the PVM files must be parsed to determine that the image files do not belong to any album. This process is also time consuming.

However, in the embodiments of present invention described herein, a groping distinguisher that represents an album to which a current image file belongs is designated to the file name or a MarketNote data area of the current image file. Thus, the current image file can be marked with an album icon simply by checking an album from the grouping distinguisher and parsing only the PVM file of that album, and the time required to mark the image file with an icon is reduced. Moreover, since the grouping distinguishers of the image files having no icons have the default value of 0, the PVM files do not need to be parsed in order to determine that the image files do not belong to any album. As described above, the time required to mark or not mark an image file with an icon according to the embodiments of the present invention is reduced.

In operation 1103, when the image files recorded in the memory card 460 are played back, the digital signal processing unit 470 receives from a user a signal for an album edit with respect to an image file. The album edit can be an addition of an image file not designated to any album to an arbitrary album, a transfer of an image file between albums, or a deletion of an image file from an album (i.e., a deletion of an album attribute from an image file within an album).

When the digital signal processing unit 470 receives an edit signal for adding an image file not designated to any album to an arbitrary album from a user in operation 1105, the digital signal processing unit 470 changes the grouping distinguisher of the file name of the image file from the default value of 0 to a grouping distinguisher for the album, or changes the grouping distinguisher recorded in the MakerNote data area of the image file from the default value of 0 to the grouping distinguisher for the album, in operation 1107. When the digital signal processing unit 470 receives an edit signal for moving an image file between albums from a user in operation 1109, the digital signal processing unit 470 changes the grouping distinguisher of the file name of the image file, which represents the album to which the image file currently belongs, to a grouping distinguisher for the album to which the image file is to move, or changes the grouping distinguisher recorded in the MakerNote data area of the image file, which represents the album to which the image file currently belongs, to the grouping distinguisher for the album to which the image file is to move, in operation 1111.

When the digital signal processing unit 470 receives an edit signal for deleting an image file from an album from a user in operation 1109, the digital signal processing unit 470 changes the grouping distinguisher of the file name of the image file, which represents the album to which the image file currently belongs, to the default value of 0, or changes the grouping distinguisher recorded in the MakerNote data area of the image file, which represents the album to which the image file currently belongs, to the default value of 0, in operation 1113. After the above-described edits are performed, the digital signal processing unit 470 monitors the power state of the digital image processing apparatus and updates all the PVM files at one time when detecting a power off signal, in operation 1115.

The update upon an edit to add an image file not designated to any album to an arbitrary album adds the information part (i.e., location information and photographing time information) of the image file to the PVM file corresponding to the album to which the image file is added. The update upon an edit to move an image file between albums deletes the information part (i.e., location information and photographing time information) of the image file from a PVM file corresponding to the album from which the image file moves, and adds the deleted information part to a PVM file corresponding to the album to which the image file moves. The update upon an edit to delete an image file from an album deletes the information part (i.e., location information and photographing time information) of the image file from a PVM file corresponding to the album from which the image file is deleted. When an edit is performed using a MakerNote data area, there is no need to update a corresponding PVM file.

When a PVM file is stored in the memory card 460, the control unit 476 of the digital signal processing unit 470 controls the information updating unit 474 to directly access the memory card 460 to update the PVM file. However, when the PVM file is downloaded from the memory card 460 and stored in the internal memory 475, the control unit 476 controls the information updating unit 474 to update the internal memory 475 and instructs an update in the internal memory 475 to be uploaded to the memory card 460. Thus, when the power is turned off, the PVM files are updated with all of the edit results at one time. Therefore, the time required to update a PVM file upon every edit in the conventional art can be reduced.

In the embodiments of the present invention described above, the amount of calculation performed during image file edition is reduced, and thus the editing time is accordingly reduced. In particular, since PVM files are all updated with the results of the image file edits at one time when the power of a digital image processing apparatus is turned off, the updating time is reduced, and the number of operations of opening and closing PVM files is greatly reduced.

Moreover, a grouping distinguisher included in an image file name or recorded in a user area of an image file allows only a PVM file associated with an image file to be parsed to mark the image file with an icon. Thus, the time required to mark the image file with an icon is also reduced. Since the grouping distinguisher of an image file not designated to an album has a default value, no PVM file needs to be parsed.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A digital image processing apparatus for managing image file names comprising:
    a digital signal processing unit which generates a captured image file having a file name, the file name including a grouping attribute for the captured image file indicating a group to which the captured image file belongs, wherein during at least one of a group edit of adding a selected file to the group, a group edit of moving a selected file between groups, and a group edit of deleting a selected file from the group, without any user input command requesting to change the file name of the selected file, the digital signal processing unit changes the grouping attribute in the file name to reflect a result of the group edit on the grouping attribute resulting in the grouping attribute indicating the group to which the selected file belongs as a result of the group edit,
    wherein the captured image file follows a design rule for camera file system (DCF) standard,
    the file name includes a predetermined digit identifier according to at least one of the manufacturing company and device model, a predetermined digit serial number, a predetermined digit grouping distinguisher and an extension, and
    the predetermined digit grouping distinguisher comprises a decimal number corresponding to a binary number having an equal number of digits to a total number of groups.

2. The digital image processing apparatus of claim 1, wherein the digital signal processing unit designates the grouping attribute to one of the characters of the file name based on a design rule for camera file system (DCF) standard.

3. The digital image processing apparatus of claim 1, wherein when the digital image processing apparatus is powered off, the digital signal processing unit updates an index file, which includes location information and photographing information on the files included in the group, with the results of the edit.

4. A digital image processing apparatus for managing image file names comprising:
    a digital signal processing unit further comprising:
        a file generating unit that generates a file having a file name, the file name including a grouping attribute for a captured image indicating a group to which the captured image belongs;
    an editing unit that performs at least one of a group edit of adding a selected file to the group, a group edit of moving the selected file between groups, and a group edit of deleting the selected file from the group; and
    a file changing unit that changes the grouping attribute of the selected file on which the group edit has been performed to reflect a result of the group edit on the grouping attribute without any user input command requesting to change the file name of the selected file, resulting in changing the grouping attribute of the file name to indicate the group to which the selected file belongs as a result of the group edit,
    wherein the captured image file follows a design rule for camera file system (DCF) standard,
    the file name includes a predetermined digit identifier according to at least one of the manufacturing company and device model, a predetermined digit serial number, a predetermined digit grouping distinguisher and an extension, and
    the predetermined digit grouping distinguisher comprises a decimal number corresponding to a binary number having an equal number of digits to a total number of groups.

5. The digital image processing apparatus of claim 4, wherein the file generating unit designates the grouping attribute to one of the characters of the file name based on a design rule for camera file system (DCF) standard.

6. The digital image processing apparatus of claim 5, further comprising an information updating unit which, when the digital image processing apparatus is powered off, updates an index file which includes location information and photographing information on the files included in the group, with the results of the edit.

7. A digital image processing apparatus for managing file names comprising:
    a digital signal processing unit which designates a grouping attribute to one of the characters of a file name of a file based on a design rule for file system (DCF) standard image, the grouping attribute indicating a group to which the file belongs, and which, in response to at least one of a group edit of adding a selected file to the group, a group edit of moving a selected file between groups, and a group edit of deleting a selected file from the group, without any user input command requesting to change the file name of the selected file, changes the grouping attribute of the file to reflect a result of the group edit on the grouping attribute resulting in the grouping attribute indicating the group to which the selected file belongs as a result of the group edit and changing the file name,
    wherein the file name includes a predetermined digit identifier according to at least one of the manufacturing company and device model, a predetermined digit serial number, a predetermined digit grouping distinguisher and an extension, and the predetermined digit grouping distinguisher comprises a decimal number corresponding to a binary number having an equal number of digits to a total number of groups.

8. The digital image processing apparatus of claim 7, wherein when the digital image processing apparatus is powered off, the digital signal processing unit updates an index file which includes location information and photographing information on the files included in the group, with the results of the change.

9. A digital image processing apparatus for managing image file names comprising:
a digital signal processing unit which records a grouping attribute in a file name of a captured image file, the grouping attribute indicating a group to which the file belongs, and which, in response to at least one of a group edit of adding a selected file to the group, a group edit of moving a selected file between groups, and a group edit of deleting a selected file from the group, without any user input command requesting to change the file name of the selected file, changes the grouping attribute recorded in the captured file to reflect a result of the group edit on the grouping attribute, resulting in changing the grouping attribute of the file name to indicate the group to which the selected file belongs as a result of the group edit,
wherein the captured image file follows a design rule for camera file system (DCF) standard,
the file name includes a predetermined digit identifier according to at least one of the manufacturing company and device model, a predetermined digit serial number, a predetermined digit grouping distinguisher and an extension, and
the predetermined digit grouping distinguisher comprises a decimal number corresponding to a binary number having an equal number of digits to a total number of groups.

10. A file managing method for managing image file names performed by a digital image processing apparatus, comprising the operations of:
generating captured image files having grouping attributes for captured images in the respective file names of the captured image files, each said grouping attribute indicating a respective group to which a respective said captured image file belongs;
performing at least one of a group edit of adding a file selected from the files to the group, a group edit of moving the selected file between groups, or a group edit of deleting the selected file from the group; and
changing the grouping attribute of the selected file to reflect a result of the group edit on the grouping attribute without any user input command requesting to change the file name of the selected file to indicate the group to which the selected file belongs as a result of the group edit when the group edit is completed,
wherein the captured image file follows a design rule for camera file system (DCF) standard,
the file name includes a predetermined digit identifier according to at least one of the manufacturing company and device model, a predetermined digit serial number, a predetermined digit grouping distinguisher and an extension, and
the predetermined digit grouping distinguisher comprises a decimal number corresponding to a binary number having an equal number of digits to a total number of groups.

11. The file managing method of claim 10, further comprising the operation of, when the digital image processing apparatus is powered off, updating an index file, which includes location information and photographing information on the files included in the group, with the results of the change.

12. The file managing method of claim 10, wherein the generating includes designating the grouping attribute to one of the characters of the file name based on a design rule for camera file system (DCF) standard.

13. The digital image processing apparatus of claim 1, wherein the digital signal processing unit further controls displaying of an image based on the captured image file, the image including a symbol based on the group attribute, and the signal processing unit further controls changing the symbol in the displayed image when the captured image file is moved from the group and the group attribute is changed.

14. The digital image processing apparatus of claim 4, further comprising a display unit which displays an image based on the captured image file, the image including a symbol based on the group attribute, and changes the symbol in the displayed image when the captured image file is moved from the group and the group attribute is changed.

15. The digital image processing apparatus of claim 7, wherein the digital signal processing unit further controls displaying of an image based on the captured image file, the image including a symbol based on the group attribute, and the signal processing unit further controls changing the symbol in the displayed image when the captured image file is moved from the group and the group attribute is changed.

16. The digital image processing apparatus of claim 9, wherein the digital signal processing unit further controls displaying of an image based on the captured image file, the image including a symbol based on the group attribute, and the signal processing unit further controls changing the symbol in the displayed image when the captured image file is moved from the group and the group attribute is changed.

17. The file managing method of claim 10, further comprising:
displaying an image based on the captured image file, the image including a symbol based on the group attribute; and
changing the symbol in the displayed image when the captured image file is moved from the group and the group attribute is changed.

18. The digital image processing apparatus of claim 1, wherein the grouping attribute indicates a plurality of groups to which the captured image file belongs.

* * * * *